United States Patent
Ono et al.

(10) Patent No.: US 6,740,707 B2
(45) Date of Patent: May 25, 2004

(54) FUEL SYSTEM PART

(75) Inventors: Satoru Ono, Aichi (JP); Junji Koizumi, Aichi (JP); Kuniyoshi Kondo, Aichi (JP); Michiyoshi Matsumoto, Aichi (JP); Yoshihiro Yamami, Aichi (JP); Setsuo Morizane, Aichi (JP)

(73) Assignees: Toyoda Gosei Co., Ltd., Aichi-ken (JP); Toray Industries Inc., Tokyo (JP)

( * ) Notice: Subject to any disclaimer, the term of this patent is extended or adjusted under 35 U.S.C. 154(b) by 3 days.

(21) Appl. No.: 10/059,263

(22) Filed: Jan. 31, 2002

(65) Prior Publication Data

US 2003/0027931 A1 Feb. 6, 2003

(30) Foreign Application Priority Data

Jan. 31, 2001 (JP) .................................... 2001-023454

(51) Int. Cl.$^7$ ................................................ C08L 81/04
(52) U.S. Cl. .......................... 525/64; 525/68; 525/150; 525/189
(58) Field of Search ............................ 525/64, 68, 150, 525/189

(56) References Cited

U.S. PATENT DOCUMENTS

| | | |
|---|---|---|
| 4,514,588 A | 4/1985 | Beever |
| 4,889,893 A | 12/1989 | Kobayashi et al. |
| 5,625,002 A | 4/1997 | Kadoi et al. |

FOREIGN PATENT DOCUMENTS

| | | |
|---|---|---|
| JP | 59-167040 | 9/1984 |
| JP | 61021156 | 1/1986 |
| JP | 62-153343 | 7/1987 |
| JP | 62-153344 | 9/1987 |
| JP | 1-306467 | 12/1989 |
| JP | 3-68656 | 3/1991 |
| JP | 4159364 | 6/1992 |
| JP | 4159365 | 6/1992 |
| JP | 6001916 | 1/1994 |
| JP | 6179791 | 6/1994 |
| JP | 06190980 | 7/1994 |
| JP | 6299071 | 10/1994 |
| JP | 11100506 | 4/1999 |
| JP | 2000198923 | 7/2000 |
| JP | WO 01/027204 | 4/2001 |

*Primary Examiner*—Patricia A. Short
(74) *Attorney, Agent, or Firm*—Posz & Bethards, PLC (57) ABSTRACT

An object of the present invention is to provide a fuel system part with excellent fuel permeation resistance, and excellent shock impact resistance and heat resistance.

A fuel system part consists of a resin composition, wherein the resin composition includes (a) a polyphenylene sulfide resin and (b) an olefin based resin, wherein an amount of the (a) polyphenylene sulfide resin and the (b) olefin based resin is 80 weight % or more of the entire resin composition and the content of the (b) olefin based resin is 10 to 100 parts by weight relevant to 100 parts by weight of the (a) polyphenylene sulfide resin, and wherein the resin composition has a fuel permeability coefficient (Fuel C/ethanol=90/10) of $3.3 \times 10^{-16}$ mol·m/m$^2$·s·Pa or less at 40° C.

6 Claims, 1 Drawing Sheet

FUEL SYSTEM PART

CROSS-REFERENCES TO RELATED APPLICATIONS

The present application claims priority under 35 U.S.C. §119 to Japanese Patent Application No. 2001-023454, filed Jan. 31, 2001, entitled "FUEL SYSTEM PART". The contents of this application are incorporated herein by reference in their entirety.

BACKGROUND OF THE INVENTION

1. Field of the Invention

The present invention relates to a fuel system part consisting of a resin material. More particular, the present invention relates to a fuel system part having excellent fuel permeation resistance and having excellent shock impact resistance and heat resistance.

2. Discussion of the Background

Conventionally, as automobile fuel system parts such as fuel tanks and valves, there has been applied an HDPE (high density polyethylene) which is excellent in shock impact resistance and chemical resistance and can reduce cost. However, the HDPE has large intermolecular spaces and low cohesive power. Thus, there is a problem that fuel permeation properties are great. Recently, as an environmental restriction, evaporation restriction is provided, and it is required to suppress evaporation of hydrocarbon. Thus, there is a growing need for a material for fuel system parts with excellent fuel permeation resistance. However, in the conventional HDPS, it is difficult to cope with the foregoing problem for the above reasons.

Recently, although a material such as polyamide 12 or polyamide 6 is considered as a material having excellent fuel permeation resistance, such material is inferior to the HDPE in shock impact resistance, and is inferior to an alcohol-containing fuel in fuel permeation resistance.

As materials with permeation resistance to the alcohol-containing fuels, there are employed a liquid crystal polymer, polyketone, PBT, PPS and the like. However, there is a disadvantage that these materials are inferior in toughness or shock impact resistance.

The inventor found out an alloy material of a polyphenylene sulfide resin (hereinafter, referred to as a PPS resin) and an olefin-based resin as a material with very excellent fuel permeation resistance and excellent shock impact resistance and heat resistance that are reverse characteristics.

SUMMARY OF THE INVENTION

An object of the present invention is to provide fuel system part with excellent fuel permeation resistance and excellent shock impact resistance and heat resistance.

According to one aspect of the present invention, there is provided a fuel system part consisting of a resin composition, wherein the resin composition comprises (a) a polyphenylene sulfide resin and (b) an olefin based resin, wherein an amount of the (a) polyphenylene sulfide resin and the (b) olefin based resin is 80 weight % or more of the entire resin composition and the content of the (b) olefin based resin is 10 to 100 parts by weight relevant to 100 parts by weight of the (a) polyphenylene sulfide resin, and wherein the resin composition has a fuel permeability coefficient (Fuel C/ethanol=90/10) of $3.3\times10^{-16}$ mol·m/m$^2$·s·Pa or less at 40° C.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

According to the present invention, the fuel system part having the above construction, is excellent in permeation resistance relevant to gas and liquid fuels, and is uniformly excellent in flexibility, shock impact resistance, heat resistance, heat stability, and chemical resistance. In addition, the fuel system parts show small fuel leakage even when a high pressure is applied, and can provide excellent strength.

The fuel system part according to present invention consists of a resin composition in which a permeability coefficient of a fuel (Fuel C/ethanol=90/10) at 40° C. is $3.3\times10^{-16}$ mol·m/m$^2$·s·Pa ($1.0\times10^{-10}$ cc·cm/cm$^2$·s·cmHg) or less. Thus, fuel permeation of fuel system parts can be restricted. On the other hand, in the case where the fuel permeability coefficient of the resin composition exceeds $3.3\times10^{-16}$ mol·m/m$^2$·s·Pa, the fuel permeation resistance is not sufficient.

It is preferable that the fuel permeability coefficient of the resin composition is $3.3\times10^{-17}$ mol·m/m$^2$·s·Pa or less. With this arrangement, the fuel permeation resistance is further improved, and a fuel hardly permeates practically.

(1) Polyphenylene Sulfide Resin (PPS Resin)

(a) PPS resin contained in the above resin composition is a polymer containing a repetition unit expressed by the following structural chemical formula.

[Chemical formula 1]

It is preferable that the PPS resin is a polymer, which contains 70 mol % or more, and in particular, 90 mol % or more of the repetition unit, from the viewpoint of heat resistance.

The PPS resin can be constituted in repetition unit, less than 30 mol % of which has the following structural chemical formula.

[Chemical formula 2]

The PPS resin includes a polymer having comparatively small molecular weight obtained by a method disclosed in Japanese Patent Application Laid-open No. 45-3368 and a substantially straight chain-shaped polymer having comparatively large molecular weight obtained by a method disclosed in Japanese Patent Application Laid-open No. 52-12240.

The polymer obtained by a method described in Japanese Patent Application Laid-open No. 45-3368 can be employed after high-polymerized by heating under oxygen environment after polymerization or addition of a crosslinker such as peroxide and heating.

In the present invention, it is possible to employ a PPS resin obtained by any method, but at the same time a substantially straight chain-shaped polymer having comparatively large molecular weight produced by a producing method represented by Japanese Patent Application Laid-open No. 52-12240 described previously is preferably employed for reasons why remarkable advantageous effect of the present invention can be provided and the toughness, flexibility, and shock impact resistance of the PPS resin itself are excellent.

It is preferable that the PPS resin employed in the present invention is generated through the above polymerization process, followed by i) acid treatment, ii) hot water treatment, or iii) washing in organic solvent.

i) Acid Treatment

Acids employed in acid treatment include acetic acid, hydrochloric acid, sulfuric acid, phosphoric acid, silicic acid, carbonic acid, and propyl acid or the like, which are not limited thereto as long as they do not have action for decomposing the PPS resin. Among them, acetic acid and hydrochloric acid are preferably employed. On the other hand, acids such as nitric acid are not preferable for the reason that they decompose or degrade the PPS resin.

As a method of acid treatment, there is a method for soaking a PPS resin in an acid or acidic solution. It is possible to stir or heat the solution as required. For example, when an acetate is employed, the PPS resin powder is soaked in water solution of pH4 heated at 80 to 90° C., and is stirred for 30 minutes, thereby making it possible to obtain sufficient effect. In order to physically remove the acid or salt that remains in the PPS resin to which acid treatment is applied, it is required to wash the PPS resin with water or warm water several times.

It is preferable that the water employed for washing is distilled water or de-ionized water in order not to lose an effect of preferable chemical modification of the PPS resin caused by acid treatment.

ii) Hot Water Treatment

In hot water treatment of the PPS resin to be used in the present invention, it is important that a temperature of hot water is 100° C. or more, preferably 120° C. or more, further preferably 150° C. or more, or particularly preferably 170° C. or more. At less than 100° C., preferred advantageous effect of chemical modification of the PPS resin is small, which is not preferable.

To develop the preferable advantageous effect of chemical modification of the PPS resin caused by the hot water treatment, it is preferable that distilled water or de-ionized water is used as water. An operation for hot water treatment is carried out by charging a predetermined quantity of PPS resin into a predetermined amount of water, and heating and stirring it in a pressure vessel. At a ratio between the PPS resin and water, water is preferably larger. In general, a ratio of the PPS resin of 200 g or less to 1 l of water is selected.

It is desirable that the environment of hot water treatment is under inactive atmosphere. The reason is that decomposition of a distal end group, which is not preferable, is prevented. It is preferable that after this operation for hot water treatment, the PPS resin is washed several times by hot water to eliminate the residual component.

iii) Washing In Organic Solvent

Organic solvents employed in washing the PPS resin are not particularly limited as long as they do not have action for decomposing the PPS resin. For example, they include: nitrogen-containing polar solvents such as N-methyl pyrrolidone, dimethylformamide, dimetylacetamide, 1,3-dimethyl imidazolidinone, and hexamethyl phosphorous amide, and piperazinone group; sulfoxide or sulfone based solvents such as dimethyl sulfoxide, dimethyl sulfone, and sulfolane; ketone based solvents such as acetone, methyl ethyl ketone, diethyl ketone, and acetophenone; ether based solvents such as dimetyl ether, dipropyl ether, dioxane, and tetrahydofuran; halogen based solvents such as chloroform, methylene chloride, trichloroethylene, ethylene dichloride, perchloroethylene, monochloroethane, dichloroethane, tetrachloroethane, perchloroethane, and chlorobenzene; alcohol phenol based solvents such as methanol, ethanol, propanol, butanol, pentanol, ethylene glycol, propylene glycol, phenol, cresol, polyethylene glycol, and propropylene glycol; and aromatic hydrocarbon based solvents such as benzene, toluen, or xylene.

Amongst these organic solvents, it is particularly preferable to use N-methyl pyrrolidone, acetone, dimethylformamide and chloroform or the like. These organic solvents are used by itself or in mixture of two or more kinds of solvents.

A washing method using organic solvents includes soaking a PPS resin in organic solvents. Stirring or heating can be carried out properly as required.

A washing temperature in washing the PPS resin in organic solvents is not particular limited, and an arbitrary temperature from normal temperature to about 300° C. can be selected. The washing efficiency is prone to increase as the washing temperature is higher. In general, advantageous effect can be sufficiently obtained at the washing temperature of normal temperature to 150° C.

In a pressure vessel, the resin can be washed under pressurization at a temperature above a boiling point of organic solvent. The washing time is not particularly limited. Depending on the washing conditions, in the case of a batch type washing, sufficient advantageous effect is obtained by washing the resin for 5 minutes or more in general. In addition, continuous washing can be carried out as well.

It is sufficient to wash the PPS resin generated by polymerization in organic solvents. It is preferable that water washing or hot water washing is combined with the washing using organic solvents in order to provide more advantageous effect of the present invention. It is preferable to use water soluble organic solvents with high boiling point such as N-methyl pyrrolidone, because the residual organic solvents can be removed easily when the PPS resin is washed with water or hot water after being washed with organic solvents. It is preferable that water employed for these washings is distilled water or de-ionized water.

With respect to the fusion viscosity of the PPS resin employed in the present invention, in order to balance the flexibility and shock impact resistance of the obtained composition in high caliber, it is preferable that a melt flow rate measured according to ASTM-D1238 (a temperature of 315.5° C., and a loading of 49N (5000 g)) is 250 g/10 min or less. In particular, the flow rate of 150 g/10 min or less is employed preferably.

(2) Olefin Based Resin (b) Olefin based resin contained in the resin composition is a polymer in which olefin is (co)polymerized. Examples of the polymer are an olefin based (co)polymer; and an olefin based (co)polymer (modified olefin based (co)polymer) or the like obtained by introducing a monomer component having a functional group (hereinafter, referred to as a functional group-containing component) such as epoxy group, acidic anhydride group, metal complex carboxylate or the like.

One or more kinds of olefin based resins can be used in the present invention.

It is preferable to use together the above modified olefin based (co)polymer and one or more kinds of the other olefin based (co)polymers.

Olefin based (co)polymers include: (co)polymers obtained by polymerizing one or more kinds of α-olefins such as ethylene, propylene, butene-1, pentene-1,4-methyl pentene-1, isobutylene and the like; and a copolymer of α-olefin and α, β-unsaturated carbonic acids such as acrylic acid, methyl acrylate, ethyl acrylate, butyl acrylate, methacrylic acid, methyl methacrylate, ethyl methacrylate, and butyl methacrylate; and α-olefin and alkyl ester of α, β-unsaturated carbonic acids or the like. Preferred specific examples of olefine based (co)polymer include: polyethylene; polypropylene; an ethylene/propylene copolymer; an ethylene/butene-1 copolymer; an ethylene/methyl acrylate copolymer; an ethylene/ethyl acrylate copolymer; a ethylene/butyl acrylate copolymer; an ethylene/methyl methacrylate copolymer; an ethylene/ethyl methacrylate and an ethylene/butyl methacrylate copolymer or the like.

In addition, other copolymerizable unsaturated monomers, for example, vinyl ether, vinyl acetate, vinyl propionate, acrylonitrile, and styrene may be copolymerized with an olefin based copolymer at 40 weight % or less and within the range which does not have negative effects on an object of the present invention.

Examples of functional group-containing components for introducing a monomer component having a functional group such as epoxy group, acidic anhydride group, metal complex carboxylate into the olefin based (co)polymer, include: acidic anhydride group-containing monomers such as maleic anhydride, itaconic anhydride, citraconic anhydride, and endobicyclo-(2,2,1)-5-heptene-2,3-dicarboxylic anhydride; epoxy group-containing monomers such as glycidyl acrylate, glycidyl methacrylate, glycidyl ethacrylate, glycidyl itaconate, and glycidyl citraconate; and monomers containing metal complex carboxylate or the like.

Methods of introducing these functional group-containing components are not particularly limited. And the methods include a method of copolymerization and a method of a graft-introduction using a free-radical initiator for an olefin polymer.

It is proper that a quantity of an introduced functional group-containing monomer component is within the range of 0.001 to 40 mol %, preferably 0.01 to 35 mol % to the entire olefin (co)polymer.

Olefin (co)polymers obtained by introducing a monomer component having a functional group such as epoxy group, acidic anhydride group, metal complex carboxylate into an olefin (co)polymer, which is particularly useful in the present invention, preferably include: an olefin based (co) polymer whose essential copolymerization components are α-olefin and glycidyl ester of α, β-unsaturated carboxylic acid; an olefin based (co)polymer whose essential copolymerization components are α-olefin and acidic anhydride group-containing monomers; and an olefin based copolymer whose essential copolymerization components are α-olefin and metal complex carbonate. In addition, it is possible to further copolymerize these copolymers and α, β-unsaturated carboxylic acid such as acrylic acid, methyl acrylate, ethyl acrylate, butyl acrylate, methacrylic acid, methyl methacrylate, ethyl methacrylate, and butyl methacrylate and alkyl ester of α, β-unsaturated carboxylic acid or the like.

In the present invention, it is particularly preferable to use an olefin based copolymer whose essential components are α-olefin and glycidyl ester of α, β-unsaturated carboxylic acid.

As the glycidyl ester of α, β-unsaturated carboxylic acid, there can be employed a component shown by the following general formula of chemicals. In the formula, R denotes a hydrogen atom or a lower class alkyl group.

[Chemical formula 9]

The glycidyl ester of α, β-unsaturated carboxylic acid specifically includes glycidyl acrylate, glycidyl methacrylate, and glycidyl ethacrylate or the like. Among them, glycidyl methaclylate is preferably used.

Specific examples of an olefin based copolymer whose essential copolymerization components are α-olefin and glycidyl ester of α, β-unsaturated carbokylic acid include: an ethylene/propylene-g-glycidyl methacrylate copolymer (hereinafter, "g" denotes a graft); an ethylene/butene-1-g-glycidyl methacrylate copolymer; an ethylene/glycidyl acrylate copolymer; an ethylene/glycidyl methacrylate copolymer; an ethylene/methyl acrylate/glycidyl methacrylate copolymer; an ethylene/methyl methacrylate/glycidyl methacrylate copolymer. Among them, an ethylene/glycidyl methacrylate copolymer, an ethylene/methyl acrylate/glycidyl methacrylate copolymer, and an ethylene/methyl methacrylate/glycidyl methacrylate copolymer are preferably employed.

In the fuel system part according to the present invention, a total quantity of (a) PPS resin and (b) olefin based resin is required to be 80% by weight or more of the entire resin composition, in order to prevent degradation of high heat resistance, heat stability, and chemical resistance which are inherent to the PPS resin itself, and it is more preferable that the total quantity is 90% by weight or more.

In addition, the blend rate of the olefin based resin is 10 to 100 parts by weight to 100 parts by weight of the PPS resin. Thus, fuel system part having excellent fuel permeation resistance, heat resistance, and shock impact resistance can be obtained. On the other hand, in the case where the olefin based resin is less than 10 parts by weight, the improved advantageous effect of shock impact resistance is difficult to be obtained. Conversely, the fuel permeation resistance, heat resistance, heat stability, chemical resistance, and oil resistance which are inherent to the PPS resin itself are degraded, and the viscosity during fusion kneading increases, and a tendency that injection molding properties are degraded occurs in the case where it exceeds 100 parts by weight, which is not preferable.

Preferably, the blend rate of the olefin based resin to 100 parts by weight of the PPS resin is 10 to 60 parts by weight. Thus, a material with excellent fuel permeation resistance and shock impact resistance can be obtained.

Further preferably, the blend rate of the olefin based resin to 100 parts by weight of the PPS resin is 10 to 45 parts by weight. Thus, fuel hardly permeates practically.

In the above resin composition, the oxidization inhibitor or any other additives described below can be blended.

(3) Oxidation Inhibitor

In the present invention, it is preferable that 0.01 to 5 parts by weight of one or more kinds of oxidization inhibitors selected from among (c) phenol based, thioether based, and phosphor based agents is contained in 100 parts by weight of the (a) polyphenylene sulfide resin. Thus, heat resistance can be improved and generation of a gas component during molding can be restricted.

In addition, it is preferable to use a phenol based and phosphor based oxidization inhibitors together, because advantageous effects of maintaining heat resistance and heat stability in particular increase.

As the phenol based oxidization inhibitor, a hindered phenol based compound is preferably employed. Specific examples include: triethylene glycol-bis[3-t-butyl-(5-methyl-4-hydroxyphenyl) propionate], N,N'-hexamethylene bis(3,5-di-t-butyl-4-hydroxyhydrocinnamide), tetrakis[methylen-3-(3',5'-di-t-butyl-4'-hydroxyphenyl) propionate] methane, pentaerythrityl tetrakis[3-(3',5'-di-t-butyl-4'-hydroxyphenyl) propionate], 1,3,5-tris(3,5-di-t-butyl-4-hydroxybenzyl)-s-triazine-2,4,6-(1H, 3H, 5H)-trion, 1,1,3-tris(2-methyl-4-hydroxy-5-t-butylphenyl) butane, 4,4'-butylidenebis(3-methyl-6-t-butylphenol), n-octadecyl-3-(3,5-di-t-butyl-4-hydroxy-phenyl) propionate, 3,9-bis[2-(3-(3-t-butyl-4-hydroxy-5-methylphenyl) propionyloxy)-1,1-dimethylethyl]-2,4,8,10-tetraoxaspiro [5,5] undecane, 1,3,5-trimethyl-2,4,6-tris-(3,5-di-t-butyl-4-hydroxybenzyl) benzene or the like.

Among them, an ester type polymeric hindered phenol type is preferable. Specifically, there are preferably employed tetrakis [methylene-3-(3',5'-di-t-butyl-4'-hydroxyphenyl) propionate] methane, pentaerithrityltetrakis [3-(3',5'-di-t-butyl-4'-hydroxyphenyl) propionate], 3,9-bis [2-(3-(3-t-butyl-4-hydroxy-5-methylphenyl) propionyloxy)-1,1-dimethylethyl]-2,4,8,10-tetraoxaspiro[5,5] undecane or the like.

Next, the thioether based oxidization inhibitors include: tetrakis [methylene-3-(dodecylthio) propionate] methane, dilauryl-3, 3'-thiopropionate, distearyl-3,3'-thiodipropionate or the like.

Next, the phosphor based oxidization inhibitors include: bis(2,6-di-t-butyl-4-methylphenyl) pentaerythrithol-diphosphite; bis(2,4-di-t-butylphenyl) pentaerythritol-diphosphite; bis (2,4-di-cumylphenyl) pentaerythritol-diphosphite;

tris(2,4-di-t-butylphenyl)phosphite;

tetrakis (2,4-di-t-butylphenyl)-4,4'-bisphenylene phosphite;

di-stearyl pentaerythritol-di-phosphite; triphenyl phosphite; and 3,5-di-butyl-4-hydroxy benzyl phosphonate diethyl ester or the like.

Among them, an oxidization inhibitor has preferably high melting point in order to reduce evaporation or decomposition of the oxidization inhibitor. Specifically, there is preferably employed:

bis(2,6-di-t-butyl-4-methylphenyl) pentaerythrithol-diphosphite; bis(2,4-di-t-butylphenyl) pentaerythrithol-di-phosphite; and bis(2,4-di-cumylphenyl) pentaerythrithol-di-phosphite or the like.

(4) Others

Further, a resin other than olefin based copolymer can be added to the PPS resin composition according to the present invention in the range that advantageous effect of the present invention may not be derogated. For example, a small amount of thermoplastic resin with its high flexibility is added, thereby making it possible to further improve flexibility and shock impact resistance. However, if this amount is 20% by weight or more of the entire composition, high heat resistance, heat stability, and chemical resistance which are inherent to the PPS resin are degraded, which is not preferable. In particular, addition of 10% by weight or less is preferably used.

Specific examples of the thermoplastic resin include: a polyamide resin; a polybutylene telephthalate resin; a modified polyphenylene ether resin; a polysulfone resin; a polyaryl sulfone resin; polyketone resin; a polyether imide resin; apolyarylate resin; a liquid crystal polymer; a polyether sulfone resin; a polyether ketone resin; a polythioether ketone resin; a polyether ether ketone resin; a polyimide resin; a polyamide imide resin; and a polyethylene tetrafluoride resin or the like. In addition, the following compounds can be added for the purpose of modification. There can be blended: coupling agents such as isocyanate based compound, organic silane based compound, organic titanate based compound, organic boran based component, and epoxy compound; plasticizers such as polyalkylene oxide oligomer based compound, thioether based compound, ester based compound, and organic phosphor based compound; a crystal nucleus agent such as talc, kaoline, organic phosphor compound, and polyether ether ketone; polyolefin such as polyethylene or polypropylene; metal soaps such as wax montanate or analogous, lithium stearate or aluminum stearate; molding release agents such as condensation of ethylenediamine, stearate, and sebacate, or silicon based compound; color protection agents such as hypophosphite, and any other normal additives such as lubricant, ultraviolet-ray proof agent, coloring agent, flame retardant, and blowing agent. Since the properties inherent to the PPS resin is degraded, it is not preferable that and amount of any of the above compounds exceeds 20% by weight of the entire resin component. Addition of 10% by weight or less is preferable, and 1% by weight or less is further preferable.

The resin component is kneaded by means of a kneading machine or the like. As a typical method of kneading the resin composition by a melt-kneading machine, there is a method wherein the resin composition is supplied to generally well known melt-kneading machines such as a single-shaft or double-shaft extruder, a Banbbarry mixer, a kneader, and a mixing roll and is kneaded at a temperature of 280 to 380° C. In order to control the dispersion mode of an olefin based copolymer as described above, it is preferable that shearing force is comparatively strong. Specifically, it is preferable in a kneading method that a double-shaft extruder is used and the resin temperature during mixing is 320 to 380° C. At this time, the raw material mixing sequence is not particularly limited. The kneading methods include a method of melt-kneading all raw materials using the above method after blending all raw materials; a method of melt-kneading part of the raw materials using the above method after blending the part of the raw materials, and further, melt-kneading after blending the residual raw materials; and a method of blending part of the raw materials, followed by mixing the residual raw material using a side feeder during melt-kneading with the single-shaft or double-shaft extruder. Any of the above methods can be employed. With respect to a small amount of additive component, the other components are kneaded and produced as a pellet by any of the above methods or the like, and thereafter, the component is added prior to molding, and can be subjected to molding.

The fuel system part according to the present invention consist of a resin composition in which type and quantity of the above (a) PPS resin and (b) olefin based resin and their compounding conditions are adjusted so as to provide the above physical properties.

Specific examples of the fuel system part according to the present invention include a fuel tank, a valve, a fuel hose, a fuel hose joint, a fuel pump, a fuel pump housing, a canister, and the like.

It is preferable that the resin composition has 30% or more, and in particular, 50% or more of tensile elongation at break measured in accordance with ASTM-D638 under the condition that the temperature is 23° C. and the relative humidity is 50%. In this manner, advantageous effect of the invention can be provided, and there can be provided fuel system part with excellent product drop shock impact resistance or impact/breakage resistance during vehicle collision or the like and with excellent fuel permeation resistance. On the other hand, in the case where the degree of tensile elongation at break is less than 30%, these properties may not be provided satisfied.

It is preferable that the resin composition has 100 J/m or more Izod impact strength which is measured in accordance with ASTM-D256. The above Izod impact strength denotes Izod impact strength with notch. In this manner, advantageous effect of the invention can be provided. Moreover, the fuel system part formed of the resin composition having the above Izod impact strength are excellent in product drop shock impact resistance or in impact/breakage resistance during vehicle collision or the like, and is excellent in fuel permeation resistance as well. In the case where the above Izod impact strength is less than 100 J/m, these properties are not provided sufficiently.

It is preferable that the (b) olefin based resin is an olefin based copolymer, wherein α-olefin of 60 to 99% by weight and α, β-unsaturated carboxylic glycidyl ester of 1 to 40% by weight are copolymerized. In this manner, advantageous effect of the invention can be provided. Moreover, the dispersion properties of the olefin based resin is improved, and sufficient flexibility can be provided. On the other hand, in the case where α-olefin is less than 60% by weight or in the case where α, β-unsaturated carboxylic glycidyl ester exceeds 40% by weight, the resin composition may be gelled at the time of melt-kneading with the PPS resin. In the case where α-olefin exceeds 99% by weight or in the case where α, β-unsaturated carboxylic glycidyl ester is less than 1% by weight, a functional group reacting with the PPS resin is small in amount, and the dispersion properties are poor. Thus, sufficient effect of providing flexibility may not be obtained.

In particular, it is preferable that α-olefin is 97 to 70% by weight, and α, β-unsaturated carboxylic glycidyl ester is 3 to 30% by weight. As a specific example, there is preferably employed a copolymer that contains ethylene/glycidyl methacrylate at a rate of 70 to 97% by weight/3 to 30% by weight.

Specific examples of an olefin based (co)polymer having a monomer that contains α-olefin and an acidic anhydride group as essential copolymerization components include: an ethylene/propylene-g-maleic anhydride copolymer; an ethylene/butene-1-g-maleic anhydride copolymer; an ethylene/methyl acrylate-g-maleic anhydride copolymer; an ethylene/ethyl acrylate-g-maleic anhydride copolymer; an ethylene/methyl methacrylate-g-maleic anhydride copolymer; and an ethylene/ethyl methacrylate-g-anhydrous maleate copolymer. Specific examples of olefin based copolymers having α-olefin and a metal complex carboxylate as essential copolymerization components include: a zinc complex of ethylene/methacrylate copolymer; a magnesium complex of an ethylene/methacrylate copolymer; and a sodium complex of an ethylene/methacrylate copolymer.

In the present invention, as described above, it is preferable to use an olefin based copolymer having α-olefin of 60 to 90% by weight and α, β-unsaturated carboxylic glycidyl ester of 1 to 40% by weight as essential copolymerization components as (b) component. Among them, it is preferable to use together such copolymer and an olefin based (co) polymer that does not have any functional group of, epoxy group, acidic anhydride group, and metal complex carboxylate. For example, an ethylene/butene-1 copolymer and an ethylene/propylene copolymer and the like are preferably employed. Because an olefin based (co)polymer without functional group has high flexibility, it is preferable that the melting flow rate (MFR) is comparatively low. In particular, the rate of 3 g/10 min (ASTM-D1238, 190° C., a loading of 21.18N (2160 g)) or less is preferable.

In addition, it is preferable that when an olefin based (co)polymer having a functional group and an olefin based (co)polymer that does not have any functional group is used together as (b) components, the former is 10 to 40% by weight, and the latter is 90 to 60% by weight relevant to the total of them.

It is preferable that the (b) olefin based resin is dispersed in the resin composition at an average particle diameter of 0.5 micron or less. In this manner, advantageous effect of the invention can be provided. Moreover, the fuel permeation resistance is further improved.

Further, it is preferable that an average particle diameter of (b) olefin based resin dispersed in the resin composition is 0.3 micron or less. In this manner, the fuel permeation resistance is further improved.

Hereinafter, the present invention will be described in more detail by way of Examples. The present invention is not limited to these Examples.

In the following Examples, material properties were measured in accordance with the following method. In addition, an MFR hold rate as an index of heat stability, a flexural modulus at 80° C. as an index of heat resistance, and oil resistance (increment by weight) as an index of chemical resistance were measured in accordance with the following method. Test specimens each employed for these physical properties measurement of materials were prepared by injection molding (cylinder temperature 320° C. and mold temperature 130° C.).

[Average Particle Diameter of Olefin Based Resin]

As a test specimen, an ASTM No. 1 dumbbell specimen was injection-molded in accordance with the above method. Next, a thin piece of 0.1 micron or less was cut from the center of the dumbbell specimen at −20° C. With respect to arbitrary 100 elastomer dispersion portions when observed by a transmission electron microscope, the maximum diameters and minimum diameters of the 100 elastomers each were first measured. Then, the average values of the maximum diameters and minimum diameters of the 100 elastomers each were obtained, and then, an average value of the average values was obtained.

[Tensile Elongation at Break]

The tensile elongation at break was measured in accordance with ASTM-D638.

[Izod Impact Strength]

A test specimen was prepared by injection molding, a notch was provided, and the notched Izod impact strength was measured in accordance with ASTM-D256.

[Flexural Modulus at 80° C.]

The flexural modulus was measured at 80° C. in accordance with ASTM-D790.

[MFR Hold Rate, MF60/MF5]

The MFR (MF5) when the retention time is 5 minutes and the MFR (MF60) when the dwell time is 60 minutes were measured respectively at 315.5° C. of measurement temperature and 49N (5000 g) of loading in accordance with ASTM-D1238-86, and ratios of these (MF60/MF5) were displayed by %. It is low in the case where the viscosity is increased due to such retention. It is 100% or more in the case where the viscosity is lowered.

[Oil Resistance]

As a test specimen, the ASTM No. 1 dumbbell specimen was injection molded in accordance with the above method. Then, the molded piece was soaked in refrigerator oil (JIS 2 type, ISO56, available from Nippon Sun Oil, Suniso SG) at 100° C. for 70 hours, a change in weight was measured, and the degree of the increment by weight was displayed by %.

[Fuel Permeability Coefficient]

A plate fabricated by injection molding was melt pressed, a thin sample of 100 to 200 microns in thickness was fabricated, and the fabricated sample was employed as an evaluation sample.

A fuel gas at 40° C. was permeated through the evaluation sample by employing a differential pressure type gas permeation testing machine available from Yanagimoto MFG. CO., LTD. (model designation: Yanaco GTR-30 XVT). As fuel gas to be permeated, the gas obtained by blending Fuel C/ethanol at a rate of 90/10 (by weight) was employed. Fuel C was a mixture solution at a rate of 50/50 (by weight) in toluene/isooctane. The gas permeated the evaluation sample was detected by gas chromatography.

Two types of PPS resins were prepared in accordance with the following method.

(1) Preparation of PPS-1

A sodium sulfide 9 hydrate of 6.005 kg (25 mol); sodium acetate of 0.656 kg (8 mol); and an N-methyl-2-pyrrolidone (hereinafter, referred to as NMP) of 5 kg were prepared in an autoclave with a stirrer, and were risen in temperature up to 205° C. through nitrogen gradually. Then, water of 3.6 was exhausted. Next, after cooling a reactor to 180° C., 1,4-dichlorobenzene of 3.727 kg (25.35 mol) and NMP of 3.7 kg were added thereto, were sealed under nitrogen, and were risen in temperature up to 225° C. After 5-hour reaction, the product was risen up to a temperature of 270° C., and reacted for 3 hours. After cooling, the reacted product was washed with warm water 5 times. Next, the product was charged into NMP of 10 kg heated at 100° C., and were continuously stirred for about 1 hour. Then, the stirred product was filtered, and was washed with hot water several times. This product was charged into ph4 acetic acid water solution of 25 l which was heated at 90° C., and was continuously stirred for about 1 hour. Then, the stirred product was filtered, and was washed with ion exchange water of about 90° C. until pH of the filtrate had been 7. Then, the product was vacuum dried at 80° C. for 24 hours, and PPS-1 of MFR 100 (g/10 min) was obtained.

(2) Preparation of PPS-2

A sodium sulfide 9 hydrate of 6.005 kg (25 mol); sodium acetate of 0.656 kg (8 mol); an N-methyl-2-pyrrolidone (hereinafter, referred to as NMP) of 5 kg were prepared in an autoclave with a stirrer, and were risen in temperature up to 205° C. through nitrogen. Then, water of 3.6 l was exhausted. Next, after cooling a reactor to 180° C., 1,4-dichlorobenzene of 3.756 kg (25.55 mol) and NMP of 3.7 kg were added, were sealed under nitrogen, and were risen in temperature up to 270° C. Then, the water reacted at 270° C. for 2.5 hours. After cooling, the reacted product was washed with warm water 5 times. Next, the product was charged into NMP of 10 kg heated at 100° C., and was continuously stirred for about 1 hour. Then, the product was filtered, and further, was washed with hot water several times. This product was charged into pH4 acetic acid water solution of 25 l which was heated at 90° C., and was continuously washed with ion exchange water of about 90° C. until pH of filtrate had been 7. The product was vacuum dried at 80° C. for 24 hours, and PPS-2 of MFR 300 (g/10 min) was obtained.

The MFRs of PPS-1 and PPS-2 were measured in accordance with a method that conforms to ASTM-D1238-86 in which the measurement temperature was 315.5° C., and the loading was 49N (5000 g).

The following 5 kinds of olefin based resins were prepared.

(1) Olefine-1: Copolymer of 8/12% by Weight in Ethylene/ Glycidyl Methacrylate
(2) Olefin-2: Ethylene/1-butene copolymer Density of 864 Kg/M$^3$, MFR=3.5 g/10 min (a method that conforms to ASTM-D1238 in which the loading is 21.18N (2160 g) and the temperature is 190° C.)
(3) Olefin-3: Ethylene/1-butene copolymer Density of 861 Kg/m$^3$, MFR=0.5 g/10 min (a method that conforms to ASTM-D1238 in which the loading was 21.18N (2160 g) and the temperature was 190° C.)
(4) Olefin-4: Copolymer of 85/15 mol % in ethylene/ propylene
(5) Olefin-5: Polyethylene Density of 955 kg/m$^3$ MFR=0.03 to 0.07 g/10 min (a method that conforms to ASTM- D1238 in which the loading is 21.18N (2160 g) and the temperature is 190° C.)

The following oxidization inhibitors were prepared.
(1) Phenol based inhibitor-1: 3,9-bis[2-(3-(3-t-butyl-4-hydroxy-5-methylphenyl) propionyloxy)-1,1-dimethylethyl]-2,4,8,10-tetraoxaspiro[5,5] undecane
(2) Phenol based inhibitor-2: Pentaerithlityltetrakis[3-(3',5'-di-t-butyl-4'-hydroxyphen yl) propionate]
(3) Phosphor based inhibitor-1: bis(2,4-di-cumylphenyl) pentaerythritol-di-phosphite The crystal nucleus agent and other resins were prepared as follows.

(1) Crystal nucleus agent: PEEK (polyether ether ketone) Melting viscosity, 0.38 to 0.50 KN·s/m$^2$ (AMG/VX/12)
(2) Other resin: Nylon 12 "Amilan" CM5051F available from Toray Industries Inc.
(3) Other resin: HDPE (for Comparative Example4) High density polyethylene MFR 2.0 (190° C., loading 21.18N (2160 g)), J-Rex KM458A available from Japan Polyolefins Co., Ltd
(4) Other resin: PA12 (Nylon 12) (for Comparative Example 5) Average molecular weight of 24000, 3024U available from Ube Kousan Industries Ltd.

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| PPS resin | PPS-1 | part (s) by weight | 100 | 100 | 100 | | | | 100 | 100 | 100 |
| | PPS-2 | part (s) by weight | | | | 100 | 100 | 100 | | | |
| Olefin based resin | Olefin-1 | part (s) by weight | 6 | 10 | 12 | 15 | 29 | 11 | 25 | 25 | 12 |
| | Olefin-2 | part (s) by weight | | | | | | | | | |
| | Olefin-3 | part (s) by weight | 12 | 15 | 20 | 30 | | 33 | 42 | 42 | 20 |
| | Olefin-4 | part (s) by weight | | | | | 14 | | | | |
| | Olefin-5 | part (s) by weight | | | | | | 11 | | | |
| | Amount | part (s) by weight | 18 | 25 | 32 | 45 | 43 | 55 | 67 | 67 | 32 |
| Oxidization inhibitor | Phenol based inhibitor-1 | part (s) by weight | 0.2 | 0.2 | 0.4 | 0.3 | | | 0.5 | | 0.4 |
| | Phenol based inhibitor-2 | part (s) by weight | | | | | 2.9 | | | | |
| | Phosphor based inhibitor-1 | part (s) by weight | 0.2 | 0.2 | 0.4 | 0.3 | | | 0.5 | | 0.4 |
| Crystal nucleus agent | PEEK | part (s) by weight | 0.05 | | 0.05 | | | | | | 0.05 |
| Other resin | Nylon 12 | part (s) by weight | | | | | | 67 | | | |
| Average particle diameter of olefin based resin | | μm | 0.2 | 0.2 | 0.2 | 0.2 | 0.3 | 0.2 | 0.3 | 0.6 | 0.2 |
| Tensile elongation at break | | % | 50 | 75 | 100 | 65 | 65 | 150 | 120 | 70 | 100 |
| Izod impact strength | | J/m | 700 | 770 | 720 | 690 | 730 | 864 | 700 | 700 | 740 |
| Flexural modulus at 80° C. | | MPa | 1700 | 1400 | 1100 | 900 | 930 | 1200 | 600 | 600 | 1100 |
| MFR hold rate MF60/MF5 | | % | 90 | 85 | 90 | 85 | 90 | — | 75 | | 90 |
| Oil resistance (Degree of increment by weight) | | % | 0.03 | 0.05 | 0.2 | 0.8 | 1.0 | 6.2 | 1.4 | | 0.2 |
| Fuel permeability coefficient (*) | | | $6.6 \times 10^{-18}$ | $1.17 \times 10^{-17}$ | $1.67 \times 10^{-17}$ | $3.01 \times 10^{-17}$ | $3.17 \times 10^{-17}$ | $8.33 \times 10^{-17}$ | $2.00 \times 10^{-16}$ | $3.00 \times 10^{-16}$ | $1.67 \times 10^{-17}$ |

(*) Fuel C/ethanol = 90/10 (by weight); Measurement temperature: 40° C.; Unit: mol · m/m$^2$ · s · Pa

TABLE 2

| | | | Comparitve Example | | | | |
|---|---|---|---|---|---|---|---|
| | | | 1 | 2 | 3 | 4 | 5 |
| PPS resin | PPS-1 | part (s) by weight | 100 | 100 | 100 | HDPE | PA12 |
| | PPS-2 | part (s) by weight | | | | | |
| Olefin based resin | Olefin-1 | part(s) by weight | | 5 | 42 | | |
| | Olefin-2 | part (s) by weight | | | | | |
| | Olefin-3 | part (s) by weight | | | 80 | | |
| | Olefin-4 | part (s) by weight | | | | | |

TABLE 2-continued

| | | | Comparitve Example | | | | |
|---|---|---|---|---|---|---|---|
| | | | 1 | 2 | 3 | 4 | 5 |
| | Olefin-5 | part (s) by weight | | | | | |
| | Amount | part (s) by weight | | 5 | 122 | | |
| Oxidization inhibitor | Phenol based inhibitor-1 | part (s) by weight | | 0.2 | 0.2 | | |
| | Phenol based inhibitor-2 | part (s) by weight | | | | | |
| | Phosphor based inhibitor-1 | part (s) by weight | | 0.2 | 0.2 | | |
| Crystal nucleus agent | PEEK | part (s) by weight | | | | | |
| Other resin | Nylon 12 | part (s) by weight | | | | | |
| Average particle diameter of olefin based resin | | μm | — | 0.2 | 0.3 | — | — |
| Tensile elongation at break | | % | 6 | 12 | 70 | >500 | 250 |
| Izod impact strength | | J/m | 38 | 60 | 650 | no breaking | 70 |
| Flexural modulus at 80° C. | | MPa | 3500 | 2100 | 500 | <100 | 400 |
| MFR hold rate MF60/MF5 | | % | 140 | 100 | 30 | — | — |
| Oil resistance (Degree of increment by weight) | | % | 0 | 0 | 2.8 | — | — |
| Fuel permeability coefficient (*) | | mol · m/m² · s · Pa | $1.00 \times 10^{-18}$ | $2.33 \times 10^{-18}$ | $2.33 \times 10^{-15}$ | $3.33 \times 10^{-15}$ | $2.00 \times 10^{-16}$ |

(*) Fuel C/ethanol = 90/10 (by weight); Measurement temperature: 40° C.

EXAMPLES 1 to 9

The above components each were dry blended at a rate shown in Table 1. Among them, the olefin based resin was added to 100 parts by weight of the PPS resin in the range of 10 to 100 parts by weight. After dry blending, the resin was melted and kneaded by a double-shaft extruder set at a cylinder temperature of 290 to 320° C. for Examples 1 to 8 and 200 to 240° C. for Example 9. A extruder die temperature was 310° C. for Examples 1 to 8 and 300° C. for Example 9. A screw rotation speed of the double-shaft extruder was in the range of 200 to 250 rpm for Examples 1 to 7, 100 rpm for Example 8 and 200 rpm for Example 9. The resin temperature during melt-kneading was in the range of 345 to 355° C. for Examples 1 to 7, in the range of 320 to 323° C. for Example 8 and in the range of 335 to 345° C. for Example 9. The obtained extruded product was produced as a pellet by means of a strand cutter. The MFR hold rate was measured by employing a pellet dried at 120° C. one night. In addition, from the above components each, a test specimen was prepared by injection molding at the cylinder temperature of 320° C. and a mold temperature of 130° C., and the degree of tensile elongation at break, Izod impact strength, flexural modulus at 80° C., oil resistance, and fuel permeability coefficient were evaluated.

These results were shown in Table 1. In addition, the results of the fuel permeability coefficients were shown in FIG. 1.

COMPARATIVE EXAMPLES 1 to 5

Comparative Example 1 shows a resin composition of only PPS-1; Comparative Example 2 shows a resin composition in which a quantity of olefin based resin added to PPS-1 of 100 parts by weight is less than 10 parts by weight; and Comparative Example 3 shows a case in which a quantity of olefin based resin added to PPS-1 of 100 parts by weight is more than 100 parts by weight.

Comparative Example 4 shows a resin composition of only the above other resin (3) (HDPE). Comparative Example 5 shows a resin composition of only the above other resin (4) (PA12)

Figure 1:
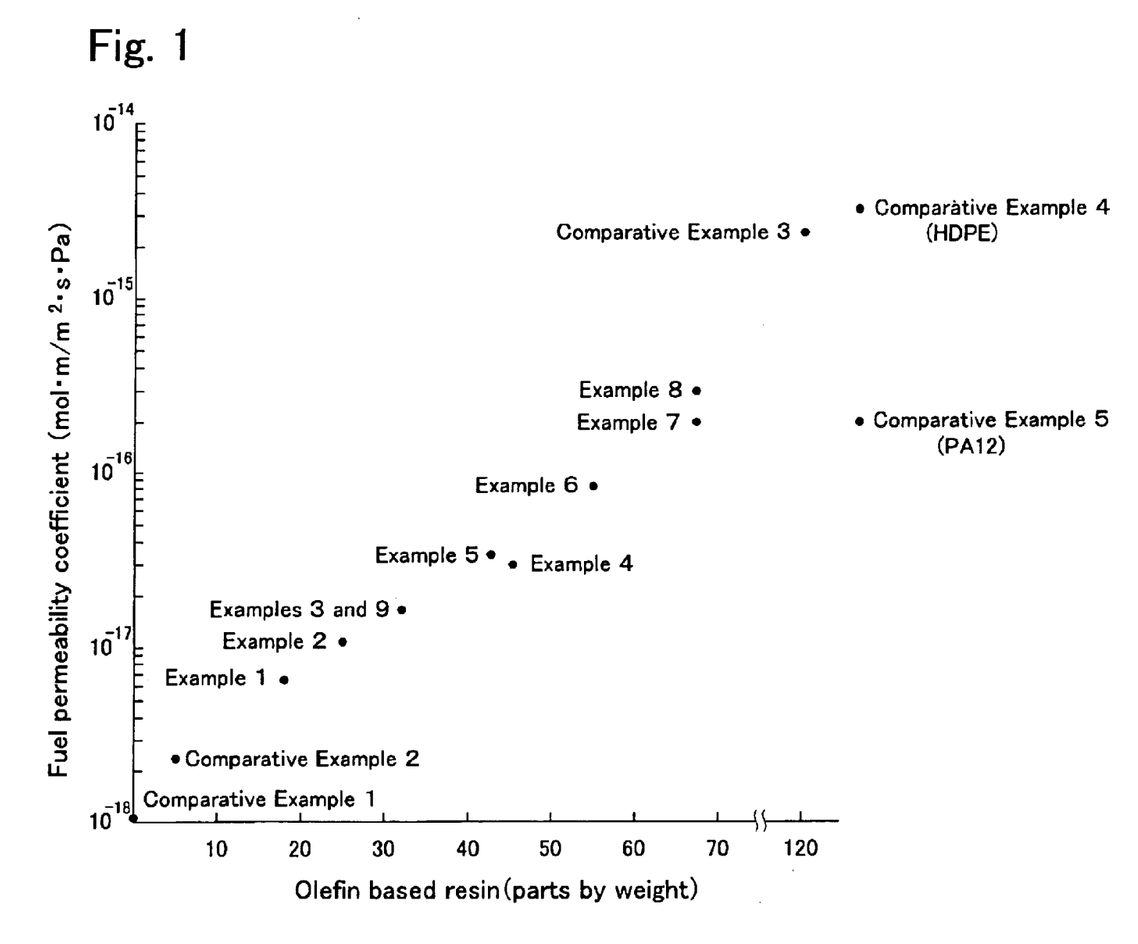
FIG. 1 is a diagram showing a relation of olefin based resin contents and fuel permeability coefficients of Examples 1 to 8 and Comparative Example 1 to 5.

The resin compositions of the above Comparative Examples 1 to 5 were pelletized and evaluated as in Example 1, and the results were shown in Table 2 and FIG.1.

A description will be given by comparing the results of the above Examples 1 to 9 and Comparative Examples 4 and 5 with each other.

In Examples 1 to 9 each, the olefin based resin was added to 100 parts by weight of the PPS resin in the range of 10 to 100 parts by weight. The fuel permeability coefficient was as small as $3.3 \times 10^{-16}$ mol·m/m²·S·Pa or less, which was excellent in fuel permeation resistance. In addition, the above resin had high degree of tensile elongation at break and Izod impact strength, and was excellent in flexibility and shock impact resistance as well.

As has been described above, it was found that the resin composition in Examples 1 to 9 each was excellent in fuel permeation resistance, was excellent in shock impact resistance and heat resistance, was very high in practicability, and was a material suitable to fuel system part.

In the case where an olefin based resin of 10 to 60 parts by weight was added to 100 parts by weight of the PPS resin (Examples 1 to 6 and 9), the fuel permeability coefficient was smaller, and the PPS resin was more excellent than PA12 (Comparative Example 5) in fuel permeation resistance, was further excellent in shock impact resistance, and was remarkably excellent in fuel permeation resistance in spite of shock performance identical to HDPE (Comparative Example 4).

In the case where an olefin based resin of 10 to 45 parts by weight was added to 100 parts by weight of the PPS resin (Examples 1 to 5 and 9), the fuel permeability coefficient was further smaller, and was at a level at which the fuel hardly permeated practically. In addition, the flexural modulus at 80° C. was remarkably excellent, as compared with PA12 (Comparative Example 5) and HDPE (Comparative Example 4), and was excellent in heat resistance that is reversed properties of shock impact resistance.

Further, in comparing Example 7 with Example 8, it was found that the tensile elongation at break and fuel permeation resistance were particularly excellent in the case where the average particle diameter of the olefin based resin was 0.5 micron or less.

In the case where the olefin based resin is less than 10 parts by weight (Comparative Examples 1 and 2), the fuel permeation resistance was excellent, and however, the degrees of tensile elongation at break and Izod impact strength were small. In the case where the olefin based resin exceeds 100 parts by weight (Comparative Example 3), the degree of tensile elongation at break and Izod impact strength were great, and however, the fuel permeability coefficient increased, and the heat resistance and oil resistance inherent to the PPS resin were lowered.

Obviously, numerous modifications and variations of the present invention are possible in light of the above teachings. It is therefore to be understood that, within the scope of the appended claims, the invention may be practiced otherwise than as specifically described here.

What is claimed is:

1. A fuel system part comprising:
a mold formed from an injection molded resin composition, wherein
the resin composition comprises (a) a polyphenylene sulfide resin and (b) an olefin based resin,
an amount of the (a) polyphenylene sulfide resin and the (b) olefin based resin is 80 weight % or more of the entire resin composition, and the content of the (b) olefin based resin is 10 to 60 parts by weight relevant to 100 parts by weight of the (a) polyphenylene sulfide resin,
the (b) olefin based resin consisting of (b1) olefin based (co)polymer having functional group and (b2) olefin based (co)polymer without functional group, the contents of the (b1) olefin based (co)polymer having functional group and the (b2) olefin based (co)polymer without functional group are 10 to 40% by weight and 60 to 90% by weight relevant to 100 parts by weight of (b) olefin based resin, respectively,
the resin composition has a fuel permeability coefficient (Fuel C/ethanol=90/10) of $3.3 \times 10^{-16}$ mol·m/m²·s·Pa or less at 40° C., and
a melting flow rate of (a) polyphenylene sulfide resin is about 100 to 300 g/10 min.

2. A fuel system part according to claim 1, wherein the resin composition has 30% or more tensile elongation at break measured in accordance with ASTM-D638 under the condition that the temperature is 23° C. and the relative humidity is 50%.

3. A fuel system pert according to claim 1, wherein the resin composition has 100 J/m or more Izod impact strength which is measured in accordance with ASTM-D256.

4. A fuel system part according to claim 1, wherein (b1) olefin hosed (co)polymer having functional group is an olefin based copolymer, wherein α olefin of 60 to 99% by weight and α, β-unsaturated carboxylic glycidyl ester of 1 to 40% by weight are copolymerized.

5. A fuel system part according to claim 1, wherein the (b) olefin based resin is dispersed in the resin composition at an average particle diameter of 0.5 micron or less.

6. A fuel system part according to claim 1, wherein the (b) olefin based resin comprises olefin based (co)polymer having a functional group selected from a group including epoxy group, acidic anhydride group and metal complex carboxylate, and one or morn kinds of the other olefin based (co)polymers,
wherein the rosin composition has 50% or more of the tensile elongation at break measured in accordance with ASTM-D638 under the condition that the temperature is 23° C. and the relative humidity is 50%.

* * * * *